United States Patent
Chung et al.

(10) Patent No.: US 12,511,051 B2
(45) Date of Patent: Dec. 30, 2025

(54) STORAGE DEVICE WITH IMPROVED READ PERFORMANCE AND OPERATION METHOD THEREOF

(71) Applicant: SK hynix Inc., Gyeonggi-do (KR)

(72) Inventors: Hyun Jin Chung, Gyeonggi-do (KR); Hee Cheol Kim, Gyeonggi-do (KR); Hee Ju Joo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/481,246

(22) Filed: Oct. 5, 2023

(65) Prior Publication Data
US 2024/0377956 A1    Nov. 14, 2024

(30) Foreign Application Priority Data
May 10, 2023 (KR) ................. 10-2023-0060738

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
CPC ..... G06F 3/0613; G06F 3/0659; G06F 3/0679
See application file for complete search history.

(56) References Cited

U.S. PATENT DOCUMENTS

| 10,528,469 | B2* | 1/2020 | Koo ..................... G11C 7/1006 |
| 2022/0050626 | A1* | 2/2022 | Oh ........................ G06F 3/0656 |
| 2022/0374163 | A1* | 11/2022 | Colella ................. G06F 3/0608 |
| 2022/0413756 | A1* | 12/2022 | Chandramani ......... G06F 3/061 |
| 2023/0360682 | A1* | 11/2023 | Yang ....................... G11C 7/14 |
| 2024/0184482 | A1* | 6/2024 | Kim ..................... G06F 3/0688 |
| 2025/0060872 | A1* | 2/2025 | Lin ....................... G06F 3/0644 |

FOREIGN PATENT DOCUMENTS

| KR | 10-2017-0059658 A | 5/2017 |
| KR | 10-2385572 B1 | 4/2022 |

* cited by examiner

*Primary Examiner* — Ryan Bertram
(74) *Attorney, Agent, or Firm* — IP & T GROUP LLP

(57) ABSTRACT

Proposed is a method of operating a memory controller, the method including receiving a program command from a host, computing the minimum number of dies in which write data is programmable in response to the program command, determining whether or not the write data is programmable in the dies corresponding to the computed minimum number, on the basis of a size of a data stored in a FTL write queue, and determining whether or not dummy data is additionally necessary to the data stored in the FTL write queue, on the basis of a result of the determining of whether or not the write data is programmable.

16 Claims, 12 Drawing Sheets

FIG. 12

| CDMv5 QD32T1 Seq.Read | Throughput (MB/s) | | | |
| --- | --- | --- | --- | --- |
| | 1GiB Range | | 16GiB Range | |
| | Before | After | Before | After |
| test1 | 7110 | 7078 | 5267 | 6448 |
| test2 | 4991 | 7095 | 7078 | 7113 |
| test3 | 7117 | 7095 | 5409 | 6389 |
| test4 | 4985 | 7081 | 5225 | 7106 |
| test5 | 4942 | 7082 | 5511 | 7119 |

READ PERFORMANCE IS GREATELY DECREASED IN CASE WHERE WRITE DATA ARE NOT ALIGNED IN DIE

STORAGE DEVICE WITH IMPROVED READ PERFORMANCE AND OPERATION METHOD THEREOF

CROSS REFERENCE TO RELATED APPLICATION

The present application claims priority to Korea Patent Application No. 10-2023-0060738, filed May 10, 2023, the entire disclosure of which is incorporated herein by reference for all purposes.

BACKGROUND

Field

Various embodiments of the present disclosure relate to an operation of a storage device and more particularly to an operation method of a storage device with improved read performance and a method of operating the storage device.

Description of the Related Art

A storage device is capable of storing data on the basis of a request from a computer, a mobile terminal such as a smartphone or a tablet, or an external device such as various electronic devices.

The storage device may include a memory and a memory controller for controlling the memory. The memory controller may receive a command from an external device, may read data from the memory on the basis of the received command, may write/program data to the memory, or may perform or control operations for erasing the data of the memory.

In a file system, a unit for reading is approximately the same as a unit for writing.

When write data for the host are not aligned with each other in accordance with a die unit for a NAND gate, the controller of the storage device has to make twice as many requests as are necessary when data are aligned in accordance with the die unit, thereby causing a decrease in read performance. In a case where this situation continues, a decrease in overall read performance may occur.

SUMMARY OF THE INVENTION

An object of the present disclosure is to provide a storage device capable of programming write data more efficiently in order to improve read performance of a storage device and a method of operating the storage device.

Another object of the present disclosure is to provide a storage device capable of programming write data in such a manner that the number of dies in which the write data is programmable is minimized and a method of operating the storage device.

The present disclosure is not limited to the above-mentioned objects. From the following description, an object not mentioned would be clearly understood to a person of ordinary skill in the art to which the present disclosure pertains.

According to an aspect of the present disclosure, there is provided a method of operating a memory controller, the method including: receiving, from a host, a program command comprising a write data to be written to a memory; computing a minimum number of dies in which the write data is programmable; determining based on a size of data stored in a flash translation layer (FTL) write queue, whether the write data is programmable in the minimum number of dies; and determining, based on whether the write data is programmable in the minimum number of dies, whether dummy data is necessary.

According to another aspect of the present disclosure, there is provided a storage device including: a memory including a plurality of dies; and a memory controller configured to receive, from a host, a program command comprising a write data to be written to the memory, to compute a minimum number of dies in which the write data is programmable, to determine, based on a size of data stored in a flash translation layer (FTL) write queue, whether the write data is programmable in the minimum number of dies; and to determine based on whether the write data is programmable in the minimum number of dies, whether dummy data is necessary.

According to an another aspect of the present disclosure, there is provided a method of operating a memory controller, the method including: buffering, in units of reference sizes, data pieces into a buffer of a flush size or greater; and flushing, in units of the flush size, the buffered data into a memory device, the flush size being a multiple of the reference size, wherein the buffering includes: buffering, into one or more first areas, a first data piece having a size corresponding to a multiple of the reference size such that the first areas become full of the first data piece; buffering, into a second area, one or more second data pieces each having a size corresponding to an aliquot of the reference size such that the second area becomes full of the second data pieces; and buffering, into a third area, dummy data such that the third area becomes full with the dummy data and one or more third data pieces each having a size smaller than the reference size.

BRIEF DESCRIPTION OF THE DRAWINGS

FIG. 12 is a table showing results of comparing read performance that results when employing the method of controlling a memory controller according to the embodiments of the present disclosure and read performance that results when employing a method of controlling a memory controller in the related art.

DETAILED DESCRIPTION OF THE INVENTION

Hereinafter, embodiments of the present disclosure will be described in detail with reference to the accompanying drawings.

Figure 1:
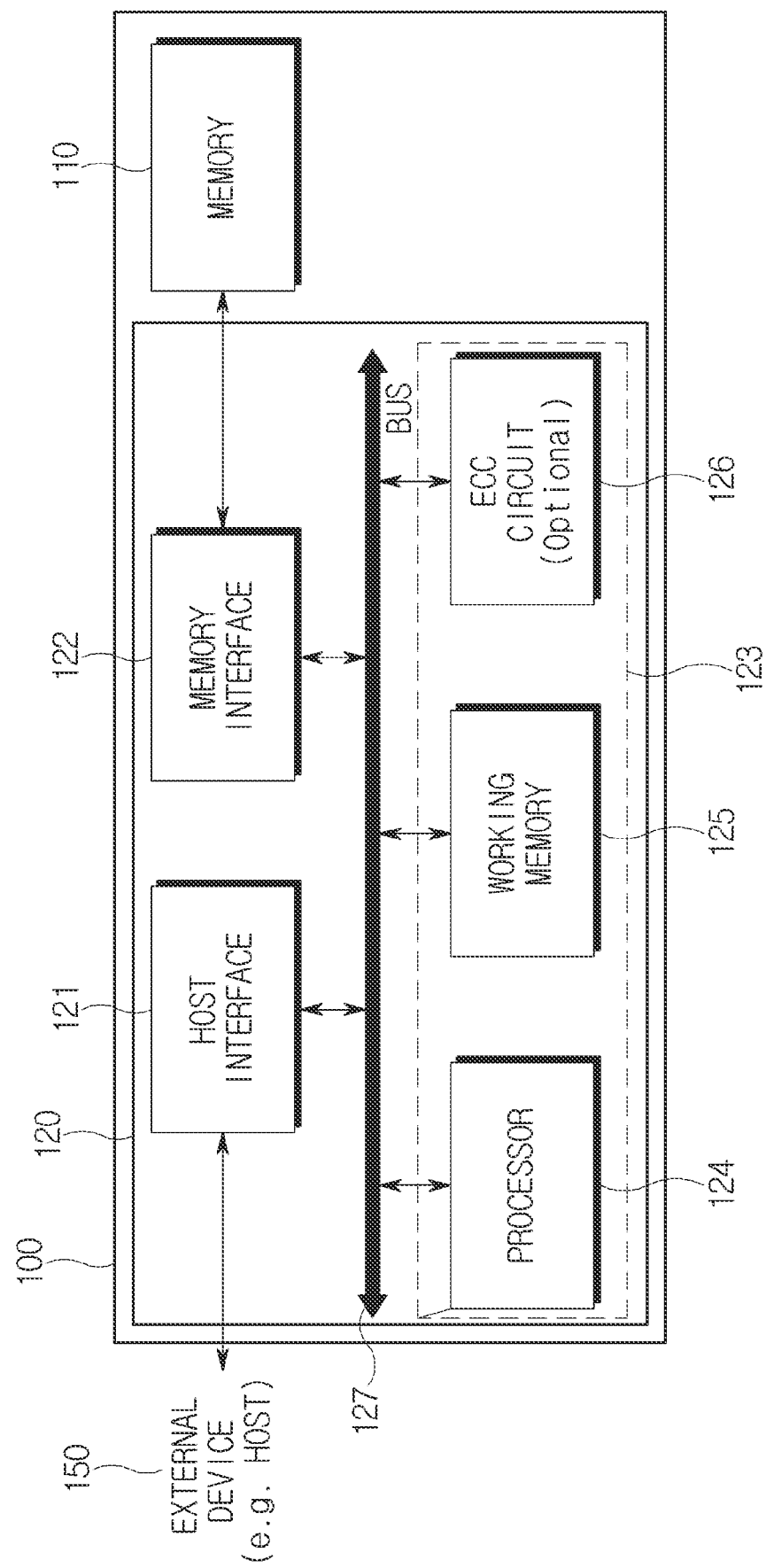
FIG. 1 is a view showing schematically a configuration of a storage device according to various embodiments of the present disclosure.

FIG. 1 is a view showing schematically a configuration of a storage device 100 according to various embodiments of the present disclosure.

With reference to FIG. 1, the storage device 100 according to the embodiments of the present disclosure may include a memory 110 in which a data piece is stored, a memory controller 120, and the like.

The memory 110 may include a plurality of memory dies DIE1 to DIE4. The plurality of memory dies DIE1 to DIE4 operate in response to control by the controller 120 through a plurality of channels CH1 to CH4, respectively. Examples of the operation of the memory 110 here may include a read operation, a program operation (also referred to as "write operation"), an erasure operation, and the like.

With reference to an embodiment in FIG. 1, at least one memory die may be connected to each of the plurality of channels CH1 to CH4. In a case where the plurality of memory dies DIE1 to DIE4 are connected to one channel, a one-time read command or program command may be applied to only one of the plurality of memory dies DIE1 to DIE4. That is, in a case where the plurality of memory dies DIE1 to DIE4 are connected to one channel, concurrent access to the plurality of memory dies DIE1 to DIE4 is not allowed, one command may be applied only to one memory die. Therefore, an example in which only one memory die is connected to each of the plurality of channels CH1 to CH4 is described in the following embodiment.

Through the plurality of channels CH1 to CH4, an operation command is sequentially transferred to the plurality of memory dies DIE1 to DIE4 that are connected to the plurality of channels CH1 to CH4, respectively, or data pieces are sequentially transferred from the plurality of memory dies DIE1 to DIE4 to the controller 120. Then, the plurality of memory dies DIE1 to DIE4, connected to the plurality of channels CH1 to CH4, respectively, which receive the operation command through the plurality of different channels CH1 to CH4, may simultaneously perform an operation according to the operation command.

According to an embodiment, each of the plurality of memory dies DIE1 to DIE4 may include at least one plane. In addition, the plane may include a plurality of memory blocks.

The memory 110 operates in response to the control of the controller 120. Here, the operation of the memory 110 may include, for example, a read operation, a program operation (also referred to as "write operation"), and an erase operation.

For example, the memory 110 may include various types of non-volatile memory such as a NAND flash memory, a 3D NAND flash memory, a NOR flash memory, a resistive random-access memory (RRAM), a Phase-Change Memory (PRAM), a magneto-resistive random-access memory (MRAM), a ferroelectric random-access memory (FRAM), or a spin transfer torque random access memory (STT-RAM) and the like.

Moreover, the memory 110 may be implemented to have a three-dimensional array structure. The embodiments of the present disclosure can be applied not only to a flash memory in which a charge storage layer is composed of a conductive floating gate, but also to a charge trap type flash (CTF) in which the charge storage layer is composed of an insulation layer.

The memory 110 may receive commands and addresses from the controller 120 (also referred to as a memory controller) and may access an area in a memory cell array selected by an address. That is, the memory 110 may perform an operation indicated by a command with respect to the area selected by the address.

For example, the memory 110 may perform a program operation, a read operation, and an erase operation. During the program operation, the memory 110 may program data in the area selected by the address. During the read operation, the memory 110 may read data from the area selected by the address. During the erase operation, the memory 110 may erase data stored in the area selected by the address.

The controller 120 may control the program (write), read, erase, and background operations on the memory 110. Here, the background operation may include one or more of garbage collection (GC), wear leveling (WL), read reclaim (RR), or bad block management (BBM) operations.

The controller 120 may control the operation of the memory 110 in accordance with a request from an external device (e.g., a host HOST) located outside the storage device 100. Also, the controller 120 may control the operation of the memory 110 regardless of the request from the external device.

The external device may include a computer, an ultra-mobile PCs (UMPCs), a workstation, a personal digital assistant (PDAs), a tablet PC, a mobile phone, a smart phone, an e-book, a portable multimedia player (PMP), a portable game machine, a navigation system, a black box, a digital camera, a digital multimedia broadcasting (DMB) player, a smart television, a digital audio recorder, a digital audio player, a digital picture recorder, a digital picture player, a digital video recorder, a digital video player, a storage forming a data center, one of various electronic devices constituting a home network, one of various electronic devices constituting a computer network, one of various electronic devices constituting a telematics network, a radio frequency identification (RFID) device, or a mobile device (e.g., a vehicle, a robot, a drone) that travels on the ground, in the water or in the air under human control or autonomously.

The external device may include at least one operating system (OS). The operating system can manage and control overall functions and operations of the external device and can provide mutual operations between the external device and the storage device 100. The operating system may be divided into a general operating system and a mobile operating system, depending on the mobility of external devices.

Furthermore, the controller 120 and the external device may be separated from each other. In some cases, the controller 120 and the external device may be implemented as one integrated device. Hereinafter, for convenience of description, an example will be described in which the controller 120 and the external device are separated from each other.

Referring to FIG. 1, the controller 120 may include a host interface 121, a memory interface 122, a control circuit 123, and the like.

The host interface 121 provides an interface for communicating with the external device. For example, the host interface 121 may provide an interface that uses at least one of various communication standards or interfaces such as a universal serial bus (USB) protocol, a multimedia card (MMC) protocol, a peripheral component interconnection (PCI) protocol, a PCI-express (PCI-E) protocol, an advanced technology attachment (ATA) protocol, Serial-ATA protocol, a Parallel-ATA protocol, a small computer small interface (SCSI) protocol, an enhanced small disk interface (ESDI) protocol, an integrated drive electronics (IDE) protocol, a system management bus (SMBus) protocol, an inter-integrated circuit (I2C) protocol, an improved inter-integrated circuit (I3C) protocol, a proprietary protocol, etc.

The control circuit 123 may receive a command through the host interface 121 and may perform an operation of processing the received command.

The memory interface 122 may be connected to the memory 110 to provide an interface for communicating with the memory 110. That is, the memory interface 122 may be configured to provide an interface between the memory 110 and the controller 120 in response to control of the control circuit 123.

The control circuit 123 may control the operation of the memory 110 by performing overall control operations of the controller 120. To this end, according to an embodiment, the control circuit 123 may include a processor 124, and additionally may selectively include a working memory 125 and/or an error detection and correction circuit (ECC) 126.

The processor 124 may control overall operations of the controller 120.

The processor 124 may communicate with the external device through the host interface 121 and may communicate with the memory 110 through the memory interface 122.

The processor 124 may perform a function of a flash translation layer (FTL). The processor 124 may convert a logical block address provided by the external device into a physical block address through the flash translation layer (FTL). Through use of a mapping table, the flash translation layer may receive a logical block address and may convert the logical block address into a physical block address.

There are various address mapping methods of the flash translation layer depending on a mapping unit. Representative address mapping methods include a page mapping method, a block mapping method, and a hybrid mapping method.

The processor 124 may randomize data received from the external device. For example, the processor 124 may randomize data received from the external device by using a set randomizing seed. The randomized data may be provided to the memory 110 and programmed into the memory 110.

The processor 124 may de-randomize the data received from the memory 110 during the read operation. For example, the processor 124 may de-randomize the data received from the memory 110 by using a de-randomizing seed. The de-randomized data may be output to the external device.

The processor 124 may perform background functions for the memory 110 such as a garbage collection (GC) function, a wear leveling (WL) function, and a bad block management function.

In order to secure free space to which data is to be written when there is not enough space for the data to be written into the memory 110, the garbage collection function may collect data partially written in an existing memory block and move the data to another memory block.

In order to prevent errors and data loss of the memory 110 in advance and to improve the durability and stability of a product, the wear leveling function prevents the excessive use of a specific block by evenly writing data to all memory blocks of the memory 110.

The bad block management function may detect a bad block within the memory 110 and replace the bad block with a spare block when there is the spare block, so that data is prevented from being written to the bad block.

The processor 124 may control the operation of the controller 120 by executing firmware. That is, the processor 124 may control overall operations of the controller 120 and may execute (drive) firmware stored in the working memory 125 during booting. Hereinafter, the operation of the storage device 100 described in the embodiments of the present disclosure may be implemented in such a manner that the processor 124 executes firmware in which corresponding operations are defined.

The firmware is a program which is executed in the storage device 100 in order to drive the storage device 100 and may include various functional layers. For example, the firmware may include binary data in which codes for executing each of the aforementioned functional layers are defined.

For example, the firmware includes the flash translation layer, a host interface layer (HIL), and a flash interface layer (FIL). The flash translation layer performs a translation function between the logical block address transmitted from the external device to the storage device 100 and the physical block address of the memory 110. The host interface layer interprets the command received from the external device through the host interface 121 and transmits it to the flash translation layer. The flash interface layer transmits the command instructed by the flash translation layer to the memory 110.

Also, the firmware may include the garbage collection function, the wear leveling function, and the bad block management function.

Such firmware may be, for example, loaded into the working memory 125 from the memory 110 or from a separate non-volatile memory (e.g., ROM, NOR Flash) located outside the memory 110. When executing booting after power-on, the processor 124 may first load all or part of the firmware into the working memory 125.

The processor 124 may perform a logic operation defined in the firmware loaded into the working memory 125 in order to control the overall operation of the controller 120. The processor 124 may store a result of performing the logic operation defined in the firmware in the working memory 125. The processor 124 may control the controller 120 to generate a command or signal in accordance with the result of performing the logic operation defined in the firmware. When the part of the firmware in which the logic operation to be performed is defined is not loaded into the working memory 125, the processor 124 may generate an event (e.g., interrupt) for loading the corresponding part of the firmware into the working memory 125.

The processor 124 may load, from the memory 110, meta data required to drive the firmware. The meta data is for managing the memory 110 and may include management information on user data stored in the memory 110.

The firmware may be updated while the storage device 100 is being produced or while the storage device 100 is running. The controller 120 may download new firmware from the outside of the storage device 100 and may update the existing firmware to the new firmware.

The working memory 125 may store firmware, program codes, commands, or data required to drive the controller 120. The working memory 125 may include, for example, a volatile memory such as one or more of a static RAM (SRAM), a dynamic RAM (DRAM), and a synchronous DRAM (SDRAM).

The error detection and correction circuit 126 may detect an error bit of a target data by using an error correction code and may correct the detected error bit. Here, the target data may be, for example, data stored in the working memory 125 or data read from the memory 110.

The error detection and correction circuit 126 may be implemented to decode data with the error correction code. The error detection and correction circuit 126 may be implemented with a variety of decoders. For example, a decoder that performs non-systematic decoding or a decoder that performs systematic decoding may be used.

For example, the error detection and correction circuit 126 may detect an error bit in units of sectors set for each read data. That is, each read data may be composed of a plurality of sectors. The sector may refer to a data unit smaller than a page that is a read unit of a flash memory. The sectors constituting each read data may correspond to each other through the medium of an address.

The error detection and correction circuit 126 may calculate a bit error rate (BER) and may determine whether correction is possible in units of a sectors. For example, the error detection and correction circuit 126 may determine that a corresponding sector is uncorrectable or a fail when the bit error rate (BER) is higher than a preset reference value. On the other hand, if the bit error rate (BER) is lower than the reference value, the error detection and correction circuit 126 may determine that the corresponding sector is correctable or a pass.

The error detection and correction circuit 126 may sequentially perform error detection and correction operation on all read data. When the sector included in the read data is correctable, the error detection and correction circuit 126 may omit the error detection and correction operation on the corresponding sector in the next read data. When the error detection and correction operations on all read data are completed in this way, the error detection and correction circuit 126 may detect sectors that are determined to be uncorrectable until the end of the data. There may be one or more sectors determined to be uncorrectable. The error detection and correction circuit 126 may transmit information (e.g., address information) on the sector determined to be uncorrectable to the processor 124.

A bus 127 may be configured to provide a channel between the components 121, 122, 124, 125, and 126 of the controller 120. Such a bus 127 may include, for example, a control bus for transmitting various control signals, commands, and the like, and a data bus for transmitting various data.

Furthermore, some of the aforementioned components 121, 122, 124, 125, and 126 of the controller 120 may be removed, or some of the aforementioned components 121, 122, 124, 125, and 126 of the controller 120 may be integrated into one. In some cases, in addition to the above-described components of the controller 120, one or more other components may be added.

The memory 110 will be described in more detail with reference to FIG. 2.

Figure 2:
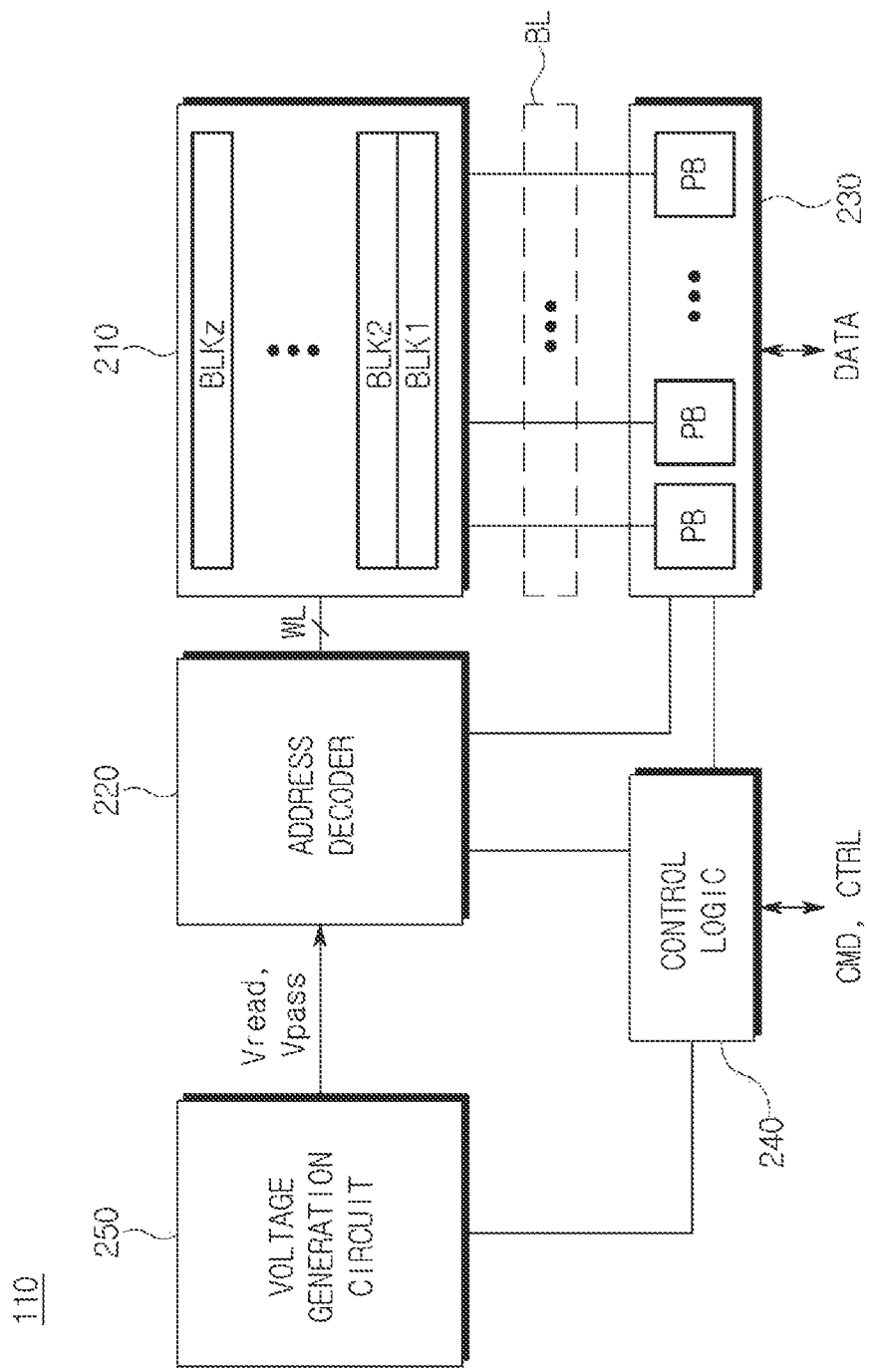
FIG. 2 is a block diagram schematically illustrating a memory in FIG. 1.

FIG. 2 is a block diagram schematically illustrating the memory 110 in FIG. 1.

With reference to FIG. 2, the memory 110 according to the embodiments of the present disclosure may include a memory cell array 210, an address decoder 220, a read and write circuit 230, a control logic 240, a voltage generation circuit 250, and the like.

According to an embodiment, the memory cell array 210 illustrated in FIG. 2 may be a memory cell array for one plane and may include a multiplicity of memory blocks BLK1 to BLKz, where z is a natural number that is equal to or greater than 2.

A multiplicity of wordlines WL and a multiplicity of bitlines BL may be arranged in the multiplicity of memory blocks BLK1 to BLKz, respectively, and a multiplicity of memory cells MC may be arranged in the multiplicity of memory blocks BLK1 to BLKz, respectively.

The multiplicity of memory blocks BLK1 to BLKz may be connected to an address decoder 220 through the multiplicity of wordlines WL, respectively. The multiplicity of memory blocks BLK1 to BLKz may be connected to a read and write circuit 230 through the multiplicity of bitlines BL, respectively.

The multiplicity of memory blocks BLK1 to BLKz may each include a multiplicity of memory cells. For example, the multiplicity of memory cells MC may be nonvolatile memory cells and may be configured as nonvolatile memory cells that have a vertical channel structure.

The memory cell array 210 may be configured as a memory cell array with a two-dimensional structure and may also be configured as a memory cell array with a three-dimensional structure.

With reference to FIG. 2, the address decoder 220, the read and write circuit 230, the control logic 240, the voltage generation circuit 250, and the like may operate as peripheral circuits that drive the memory cell array 210.

The address decoder 220 may be connected to the memory cell array 210 through the multiplicity of wordlines WL.

The address decoder 220 may be configured in such a manner as to operate in response to control by the control logic 240.

The address decoder 220 may receive an address through an input and output buffer within the memory 110. The address decoder 220 may be configured in such a manner so as to decode a block address among the received addresses. The address decoder 220 may select at least one memory block according to the decoded block address.

The address decoder 220 may receive a read voltage Vread and a pass voltage Vpass, as inputs, from the voltage generation circuit 250.

When performing an operation of applying a read voltage during the read operation, the address decoder 220 may apply the read voltage Vread to as a selected wordline WL within a selected memory block and may apply the pass voltage Vpass to the other non-selected wordlines WL.

During a program verification operation, the address decoder 220 applies a verification voltage that is generated in the voltage generation circuit 250 to the selected wordline WL within the selected memory block and may apply the pass voltage Vpass to the other non-elected wordlines WL.

The address decoder 220 may be configured in such a manner to decode a column address among the received addresses. The address decoder 220 may transmit the decoded column address to the read and write circuit 230.

The read operation and the program operation of the memory 110 may be performed on a per-page basis. Addresses that are received when a request is made for the read operation and the program operation may include one or more of the block address, a row address, and the column address.

The address decoder 220 may select one memory block and one wordline according to the block address and the row address. The column address may be decoded by the address decoder 220, and the decoded column address may be provided to the read and write circuit 230.

The address decoder 220 may include at least one of the block decoder, the row decoder, the column decoder, the address buffer, and the like.

The read and write circuit 230 may include a multiplicity of page buffers PB. During the read operation of the memory cell array 210, the read and write circuit 230 may operate as a "read circuit." During the write operation of the memory cell array 210, the read and write circuit 230 may operate as the "write circuit."

The read and write circuit 230 is also referred to as a page buffer circuit that includes a multiplicity of page buffers PB, or as a data register circuit. The read and write circuit 230 here may include a data buffer responsible for performing a data processing function. Depending on the situation, the read and write circuit 230 may further include a cache buffer responsible for performing a caching function.

The multiplicity of page buffers PB may be connected to the memory cell array 210 through the multiplicity of bitlines BL, respectively. During the read operation and the program verification operation, the multiplicity of page buffers PB continuously supply sensing electric current to the bitlines BL connected to the memory cells MC, respectively. This is done to sense a threshold voltage Vth of the memory cells MC. While performing this operation, the multiplicity of page buffers PB detect a change in an amount of flowing electric current through a sensing node, which is caused by a program state of a corresponding memory cell MC and latch the result of the sensing as a sensing data.

The read and write circuit 230 may operate in response to page buffer control signals that are output from the control logic 240.

During the read operation, the read and write circuit 230 senses data in the memory cell MC, temporarily stores the read-out data, and then outputs the data DATA to an input and output buffer of the memory 110. According to an embodiment, in addition to page buffers (PB) or page registers, the read and write circuit 230 may include a column selection circuit and the like.

The control logic 240 may be connected to the address decoder 220, the read and write circuit 230, the voltage generation circuit 250, and the like. The control logic 240 may receive a command CMD and a control signal CTRL through the input and output buffer of the memory 110.

The control logic 240 may be configured in such a manner as to control overall operations of the memory 110 in response to the control signal CTRL. The control logic 240 may output control signals for adjusting free charge potential levels of sensing nodes in the multiplicity of pages buffers PB.

The control logic 240 may control the read and write circuit 230 in such a manner to perform the read operation of the memory cell array 210. The voltage generation circuit 250 may generate the read voltage Vread and the pass voltage Vpass that are used during the read operation, in response to a voltage generation circuit control signal that is output from the control logic 240.

Each of the memory blocks of the memory 110 may be configured with a multiplicity of pages that correspond to the multiplicity of wordlines WL, respectively, and a multiplicity of strings that correspond to the multiplicity of bitlines BL, respectively.

The multiplicity of wordlines WL and the multiplicity of bitlines BL may be arranged in a memory block BLK in such a manner that the wordlines WL intersect the bitlines BL, respectively. As an example, the multiplicity of wordlines WL each may be arranged in the row direction, and the multiplicity of bitlines BL each may be arranged in the column direction. As another example, the multiplicity of wordlines WL each may be arranged in the column direction, and the multiplicity of bitlines BL each may be arranged in the row direction.

A memory cell MC may be defined by being connected to one of the multiplicity of wordlines WL and one of the multiplicity of bitlines BL. A transistor may be arranged in each memory cell MC.

In each memory block, of two outermost wordlines, a first selection line (also referred to as a source selection line or a drain selection line) may be additionally arranged outward from a first outermost wordline, positioned closer to the read and write circuit 230, and a second selection line (also referred as to a drain selection line or a source selection line) may be additionally arranged outward from a second outermost wordline that is different from the first outermost wordline.

Depending on the situation, one or more dummy wordlines may be additionally arranged between the first outermost wordline and the first selection line. In addition, one or more dummy wordline may be additionally arranged between the second outermost wordline and the second selection line.

The read operation and the program operation (the write operation) may be performed on a per-page basis, and the erasure operation may be performed on a per-memory block basis.

According to the embodiments of the present disclosure, a read performance degradation that occurs when write data from the host are stored without aligning at a reference size and a solution to prevent this read performance degradation will be described.

In the present specification, the reference size may refer to a maximum size of data that can be programmed into or read from memory cells coupled to one wordline WL in one die. As an implementation example, the reference size may be a maximum size of data that can be stored in memory cells of one wordline WL in the die. According to another embodiment, in a case where one die includes a plurality of planes, the reference size may be a maximum size of data that can be stored in memory cells of one wordline WL in the plane.

In FIGS. 3 to 5 and 8 to 11, D depicts a data piece DATA, and Dum depicts a dummy.

Figure 3:
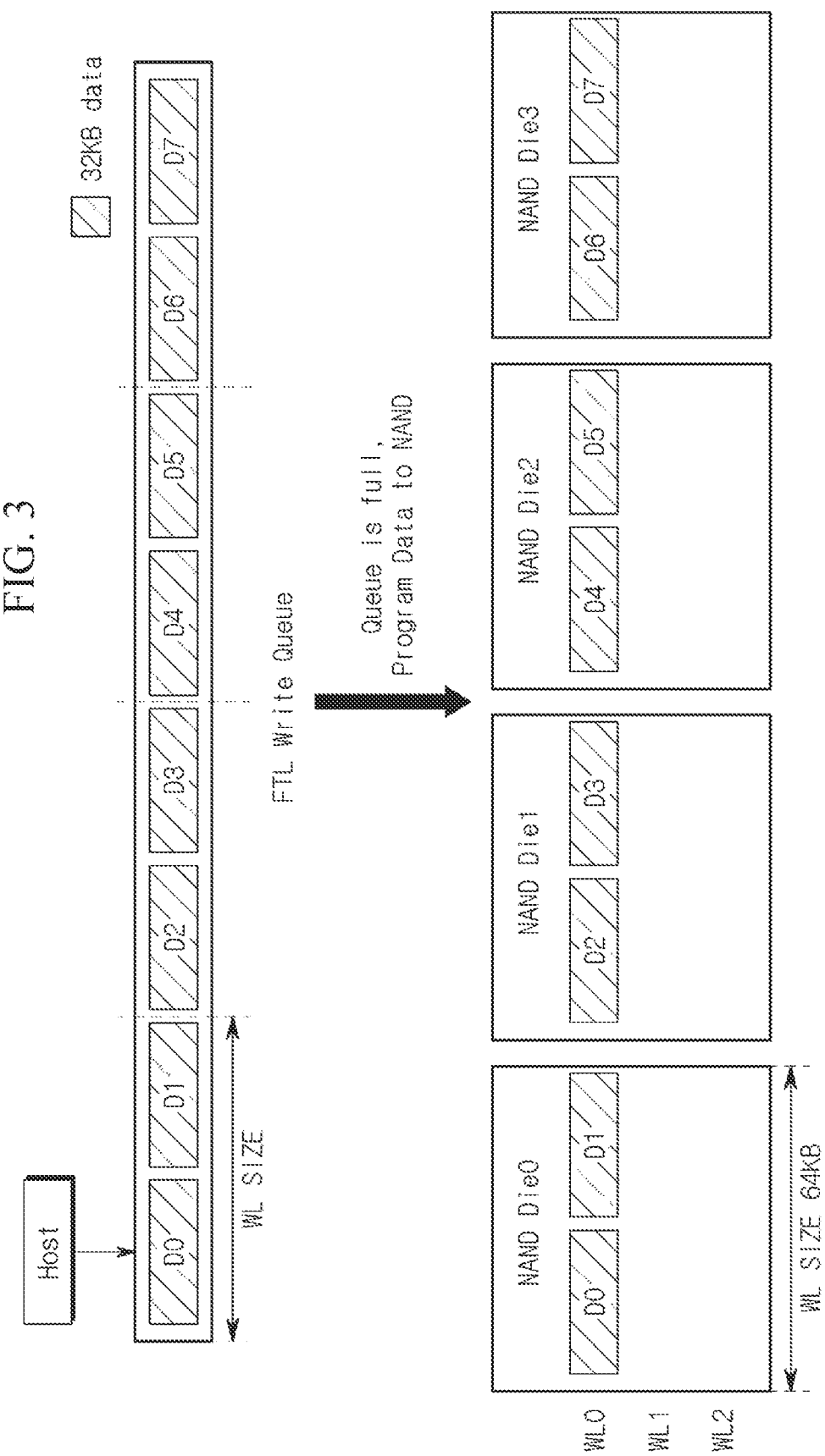
FIGS. 3 to 5 are diagrams that illustrate a description of data write and data read operations according to the embodiments of the present disclosure.
Figure 4:
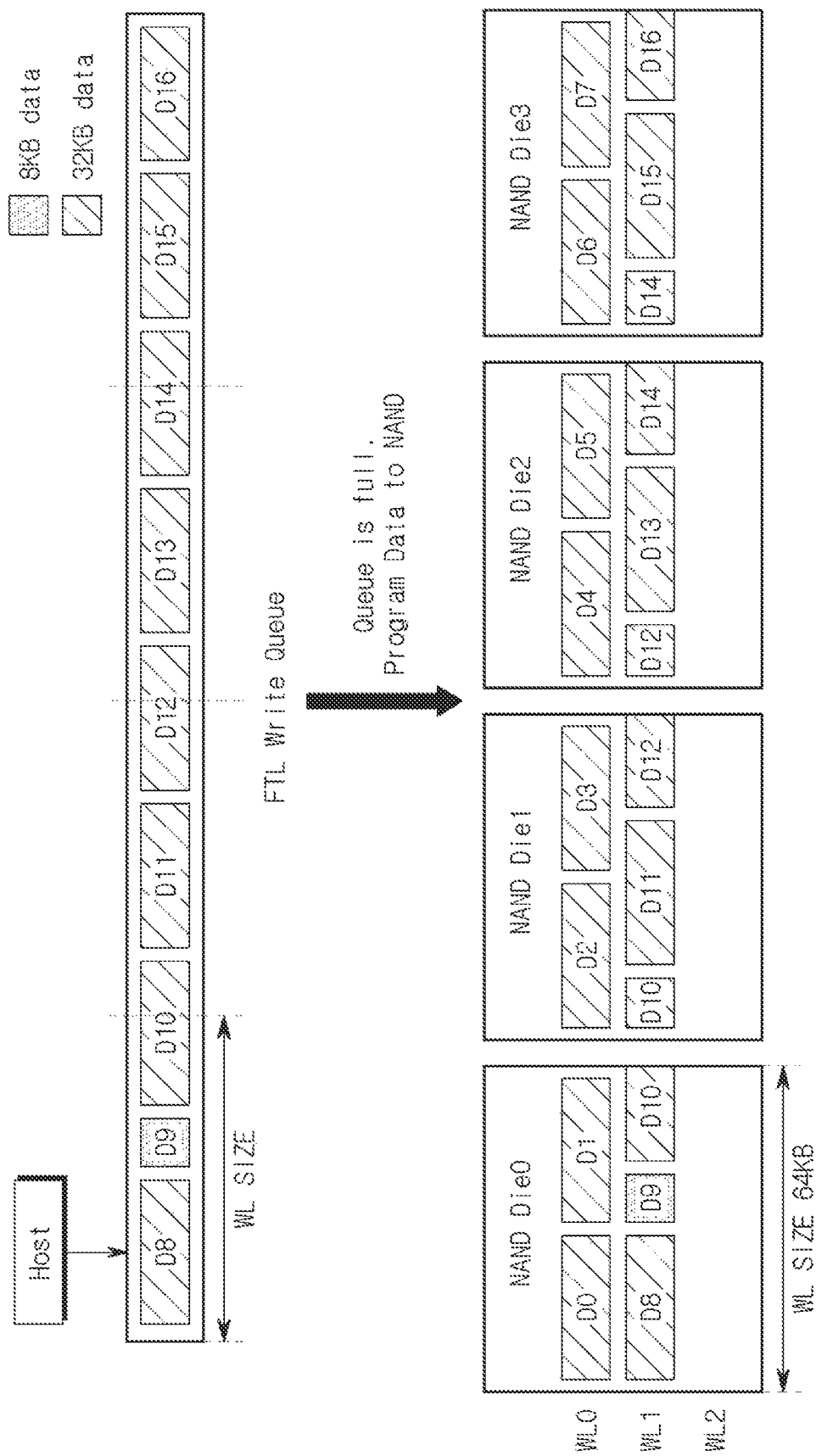
Figure 5:
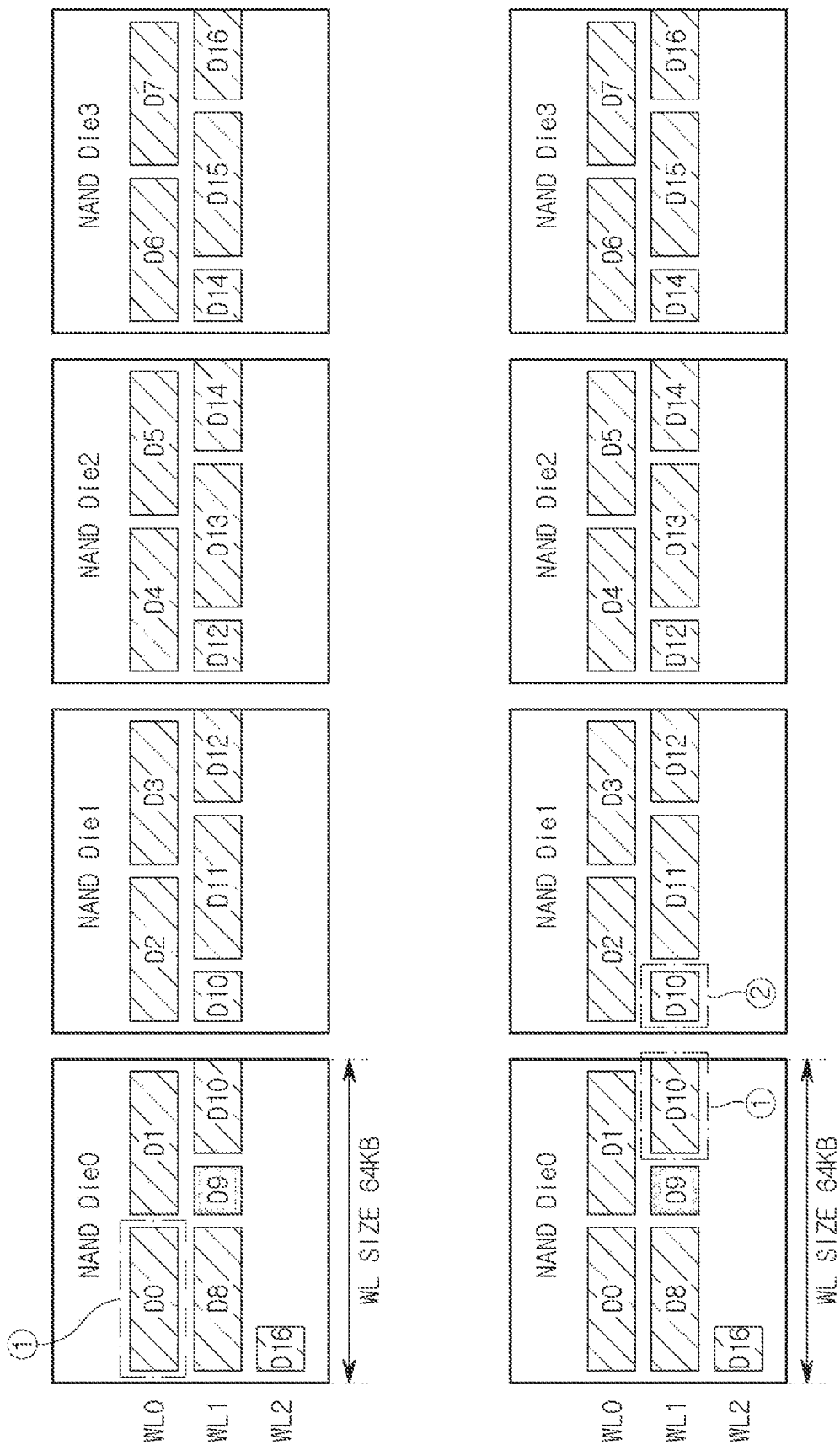

FIGS. 3 to 5 are diagrams that illustrate data write and data read operations according to the embodiments of the present disclosure.

With reference to FIG. 3 or 4, in the case of a request for a write request from the host, the controller 120 may collect data to be programed in an FTL write queue until they reach a stripe size and may program them at the same time by flushing them at a time. A size of the FTL write queue may be greater than the stripe size.

The embodiments will be described based on the following preconditions. However, it would be easily understood that all the embodiments are not limited to the following preconditions.

[Precondition 1] Maximum size of a data piece that can be stored in memory cells connected to one wordline in a die=64 KB

[Precondition 2] Stripe size of the FTL write queue managed by the controller 120=256 KB (=the number of dies DIE1 to DIE4 included in the memory 110×64 KB)

[Precondition 3] The time taken to read data from memory cells connected to one wordline in a die=40 μs With reference to FIG. 3, the host may successively make a request to write pieces of data D0 to D7 each having the same size (e.g., 32 KB). In this case, the data D0 to D7 may be programmed in such a manner that they are aligned with each other in pairs within one die.

FIG. 4 illustrates an example where the host makes an additional request to write a data piece D9 with a size of 8 KB between a data piece D8 and data pieces D10 to D16, the data D8 and D10 to D16 having a total size of 32 KB. Then, the data D8 and the data D9 may be programmed within one die. However, in a case where data are programmed in the order of the write requests, each piece of the data D10 to D16 may be divided into two groups and then the two groups of each data piece may be programmed within two different dies, without being programmed within one die. For example, the data piece D10 has to be divided into two groups and the two groups have to be stored in the respective dies DIE0 and DIE1. That is, since the data D9 with a size of 8 KB is included between the data D8 and the data D10 to D16, a situation may occur where alignment collapses in a die, that is, where some among the individual data pieces D10 to D16 cannot be programmed in one die although a data write request is made for a total data size of 32 KB enough to be programmed in one die.

FIG. 5 is a view that illustrates data pieces aligned based on the reference size and a function of reading data of which alignment collapses according to embodiments of the present disclosure.

For example, when the host makes a request to read the data D0 in die alignment, the controller 120 makes a read request only to a die 0 to read the data D0.

However, in a case where the host makes a request to read the data D10, the controller 120 has to make a read request to each of the dies 0 and 1 connected to different channels in order to read the data D10. That is, a request to read one data is made to two dies using two channels, resulting in not maximizing the read performance.

For example, requests may be concurrently made to read the data D1 and the data D2 that are received from the host, but requests may not be concurrently made to read the data D10 and the data D2, resulting in not achieving high performance. That is, the read performance cannot be improved because reading of the data D10 and reading of the data D2 are sequentially performed without being concurrently performed.

In the above-described example, since the requests to read the data D1 and the data D2 can be processed in one wordline read time, an amount of instantaneous processing can be expressed using the following Equation 1.

$$\frac{32KB \times 2}{WL \text{ Read Latency}(40us)} = 1600 MB/s \qquad \text{Equation 1}$$

In contrast, the requests to read the data D10 and the data D2 can be processed in two wordline read times, the amount of instantaneous processing can be expressed using the following Equation 2.

$$\frac{32KB \times 2}{WL \text{ Read Latency}(40us)} = 800 MB/s \qquad \text{Equation 2}$$

In order to improve the read performance on the basis of the above description, a write data needs to be written over the smallest number of dies as possible. According to an embodiment of the present disclosure, a method of writing the write data in the smallest number of dies, as possible, in order to prevent the above-mentioned decrease in read performance will be described in detail below.

Figure 6:
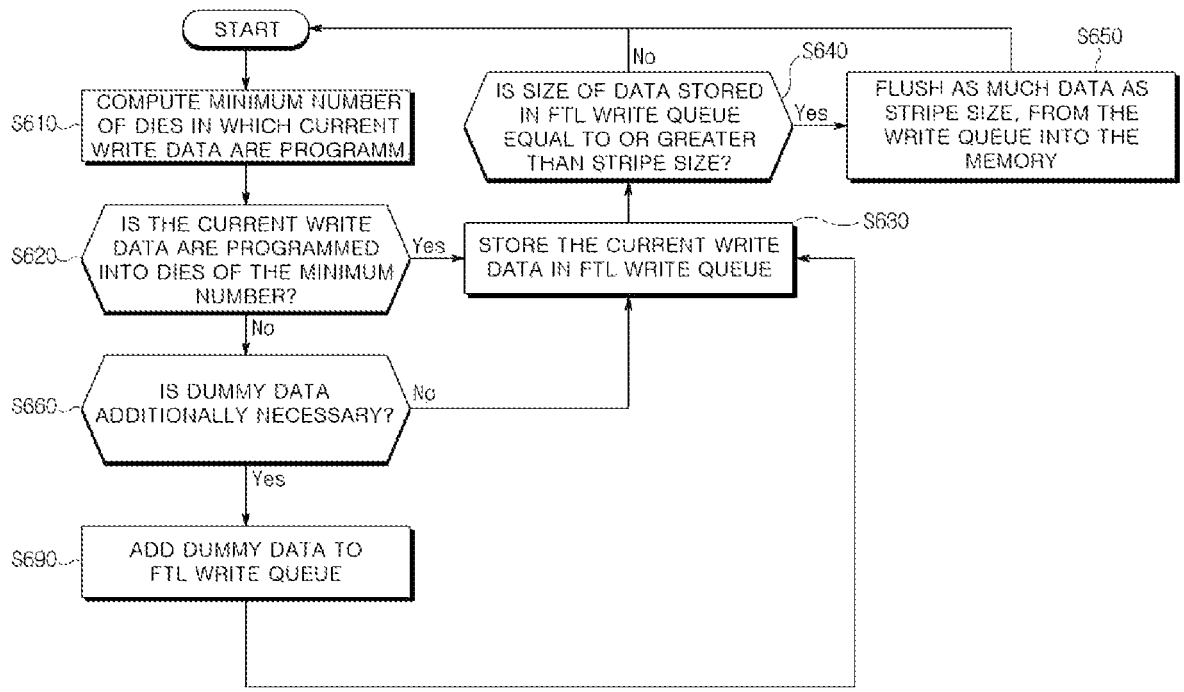
FIG. 6 is a flowchart that illustrates a method of operating a memory controller according to the embodiments of the present disclosure.

FIG. 6 is a flowchart that illustrates a method of operating a memory controller according to the embodiments of the present disclosure.

The controller 120 may receive a program command from the host. The controller 120 may compute the minimum number of dies (hereinafter, referred to as a minimum die number) in which a current write data is programmable (S610).

The minimum number of dies that are programmable may be computed using the following equation 3.

Minimum die number $MinDie =$ $$CEIL \text{ (a size of current write data/the reference size)}$$

where CEIL (x) is a function representing the smallest integer equal to or greater than x.

That is, the minimum number of dies that are programmable is the smallest integer that is equal to or greater than a value obtained by dividing a size of a current write data by the reference size.

In an example in FIG. 3 or 4, the minimum die number MinDie may be 1 according to Equation 3 because each of the data pieces D0 to D16 is smaller in size than the reference size.

It may be determined on the basis of the computed minimum die number MinDie whether or not the current write data is programmable into the dies of the minimum number (S620). In the case of the data D0 to D7 in the example in FIG. 3, because data programming can be performed only in one die, it can be determined that they are programmable into the dies of the minimum number. In contrast, because some among the individual data pieces D8 to D16 have to be programmed over two dies, it can be determined that they cannot be programmed into the dies of the minimum number. A specific method of this determination is described in more detail below.

In Operation S620, in a case where the current write data can be programmed into the dies of the minimum number, the controller 120 may store the current write data in the FTL write queue, without adding dummy data (S630).

Then, the controller 120 determines whether or not a size of data stored in the FTL write queue is greater than the stripe size. In a case where the size of the data is greater than the stripe size the controller 120 may flush as much data as the stripe size from the FTL write queue into the memory 110 to program the flushed data of the stripe size into the memory 110 (S640 and S650).

In Operation S620, in a case where the current write data cannot be programmed into the dies of the minimum number despite Equation 3, the controller 120 may determine whether or not dummy data is additionally necessary (S660). A specific method of this determination will be described in more detail below.

In a case where the result of the determination in Operation S660 indicates that the dummy data is additionally necessary, the controller 120 may add dummy data with a predetermined size to the FTL write queue (S690).

When the dummy data is determined as necessary in operation S660, operations S630, S640, and S650 may be subsequently performed.

Figure 7:
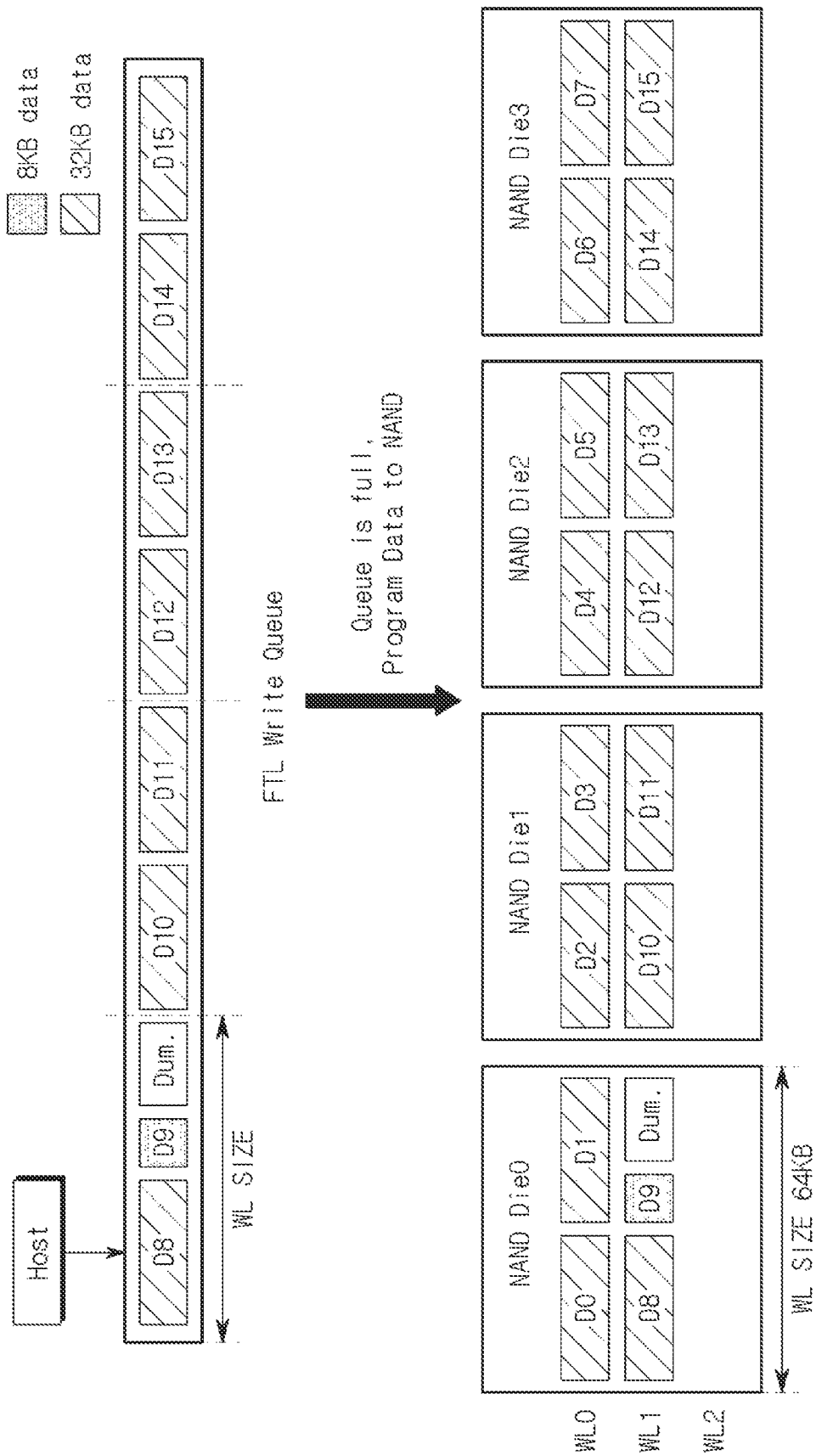
FIG. 7 is a diagram that illustrates a description of Operation S690 in FIG. 6.

FIG. 7 is a diagram that illustrates the description of Operation S690 in FIG. 6.

In operation S690, the controller 120 may determine a size of the dummy data such that a sum of the size of the data previously stored in the FTL write queue and the size of the dummy data becomes the reference size.

Figure 8:
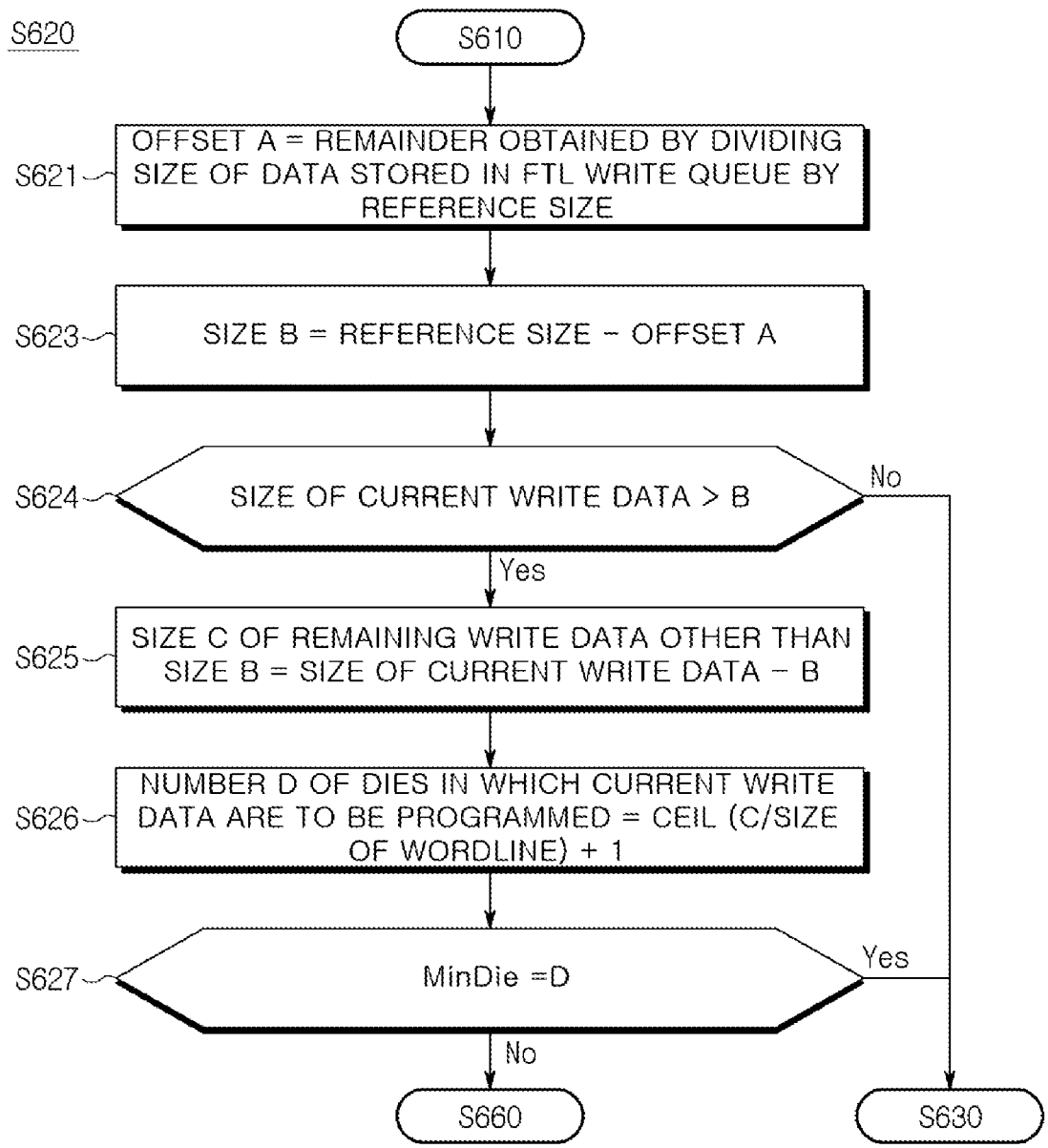
FIG. 8 is a flowchart that illustrates a specific example of Operation S620 in FIG. 6.

FIG. 8 is a flowchart that illustrates a specific example of Operation S620 in FIG. 6.

First, the controller 120 may compute a size of an offset A and may determine whether or not the size of the offset A is 0 (S621).

The offset A refers to the remainder that is obtained by dividing the size of the data stored in the FTL write queue by the reference size.

The controller 120 may compute a size B (S623).

The size B is obtained by subtracting the size of the offset A from the reference size.

The controller 120 may compare the size of the current write data with the size B (S624).

In a case where the size of the current write data is not greater than the size B, this means that the current write data is programmable into the dies of the minimum number.

However, in a case where the current write data is greater than the size B despite Equation 3, the controller 120 may compute a size C representing a remaining size of the current write data other than the size B (S625). Then, the controller 120 may determine a number D representing an actual number of dies, into which the current write data can be programmed (S626). The number D may be obtained by adding 1 to a result of Equation 3 when x of the function CEIL (x) is the size C divided by the reference number.

Then, the controller 120 may compare the number D with the minimum die number MinDie computed using Equation 3 when x of the function CEIL (x) is the size of the current write data divided by the reference number (S627).

In a case where the number D is the same as the minimum die number MinDie, this means that the actual number (i.e., the number D) of dies, into which the current write data can be programmed is the same as the result of Equation 3 when x of the function CEIL (x) is the size of the current write data divided by the reference number. That is, the current write data is programmable into the dies of the minimum number as the result of Equation 3 when x of the function CEIL (x) is the size of the current write data divided by the reference number.

However, in a case where the number D is not the same as the minimum die number MinDie, this means that the actual number (i.e., the number D) of dies, into which the current write data can be programmed is different from the result of Equation 3 when x of the function CEIL (x) is the size of the current write data divided by the reference number. That is, the current write data is not programmable into the dies of the minimum number as the result of Equation 3 when x of the function CEIL (x) is the size of the current write data divided by the reference number.

Figure 9:
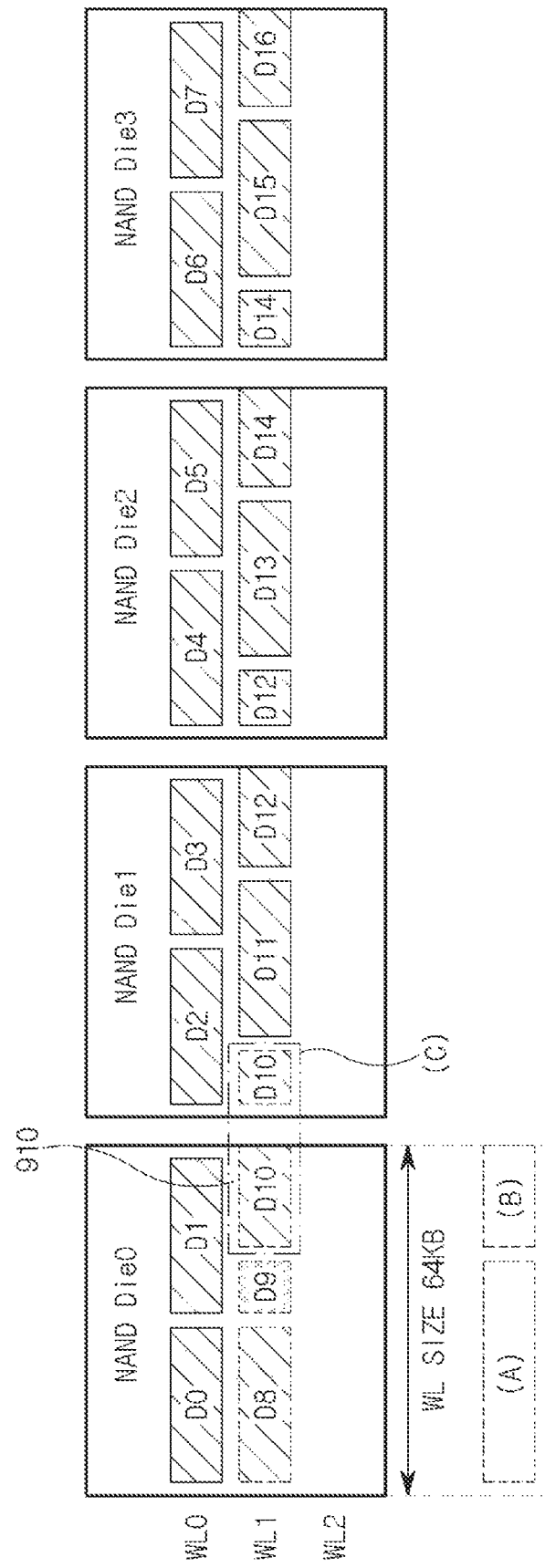
FIG. 9 is a diagram that illustrates the operations in FIG. 8.

FIG. 9 is a diagram that is referred to for description of operations in FIG. 8.

As illustrated in FIG. 9, the size B is a value that is obtained by subtracting the size of the offset A from the reference size.

Figure 10:
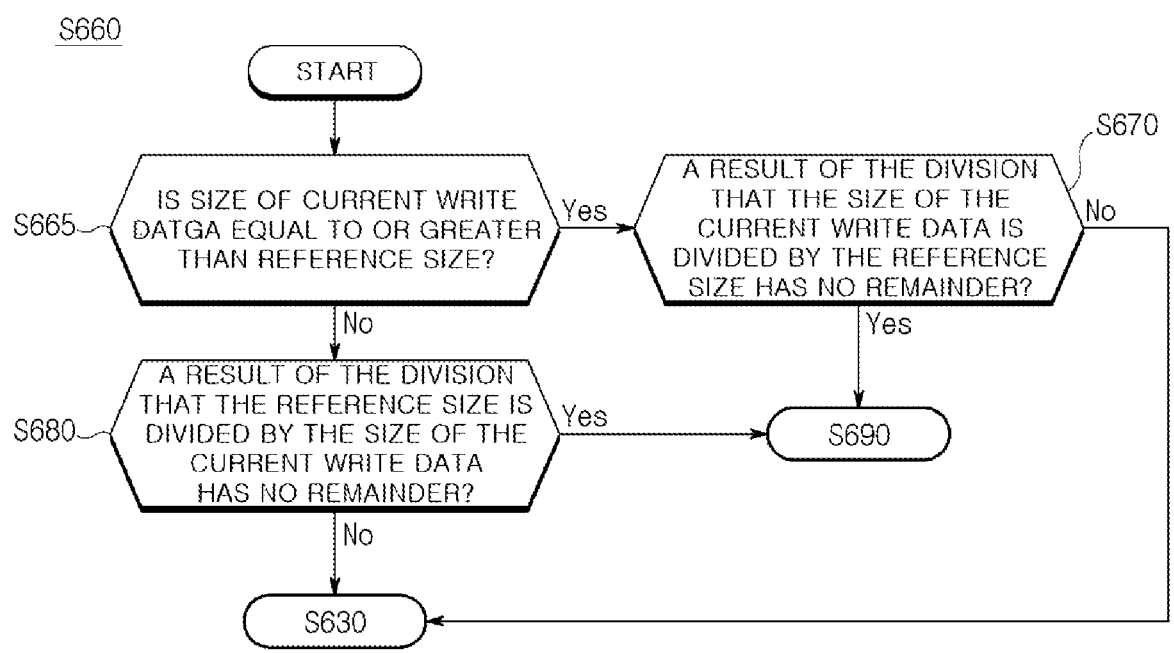
FIG. 10 is a flowchart that illustrates a specific example of Operation S660 in FIG. 6.

FIG. 10 is a flowchart that illustrates a specific example of Operation S660 in FIG. 6.

FIG. 10 illustrates one example of determining whether or not dummy data is additionally necessary.

The controller 120 may determine whether or not the size of the current write data is equal to or greater than the reference size (S665).

In a case where in Operation S665, the size of the current write data is equal to or greater than the reference size, the controller 120 may determine whether or not a result of the division that the size of the current write data is divided by the reference size has no remainder (S670). In a case where the result of the division has no remainder, the controller 120 may proceed to Operation S690 and may perform Operation S690.

In a case where, in Operation S665, the size of the current write data is smaller than the reference size, it may be determined whether or not a result of the division that the reference size is divided by the size of the current write data has no remainder (S680). In a case where the result of the division has no remainder, the controller 120 may proceed to Operation S690 and may perform Operation S690.

Figure 11:
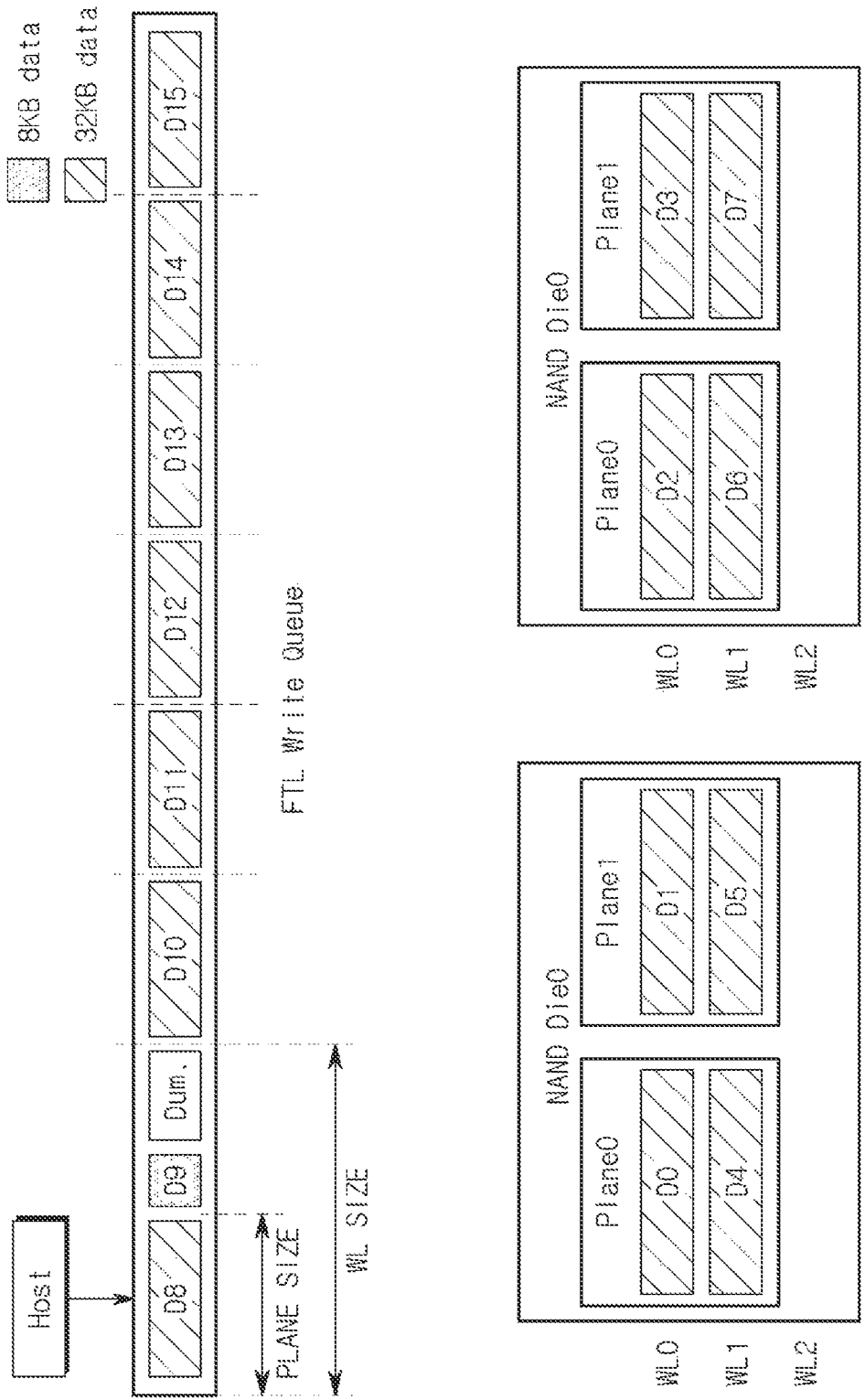
FIG. 11 is a diagram that illustrates a case in which a reference size is smaller than a size of a wordline in a die according to the embodiments of the present disclosure.

FIG. 11 is a diagram that illustrates a case where the reference size is smaller than the size of the wordline in the die according to the embodiments of the present disclosure.

As illustrated, in a case where the number of dies in which the current write data is to be programmed is not equal to a minimum die number, when a size of a current write request data is an aliquot into which a size of the plane is divided, or an integer multiple, the controller 120 may add as many dummy data as is necessary for accumulated data to be divided by the size of the plane.

In a case where the number of dummy data is too large, write performance may decrease. In addition, the larger the number of dummy data, the higher a speed of activation of wordlines and the lower a valid data ratio. Accordingly, garbage collection may be performed more frequently, and thus the lifetime of the storage device may be rapidly reduced.

Therefore, in order to address the above-mentioned issue, according to an embodiment of the present disclosure, the controller 120 may select a method of reducing the number of dummy data.

For example, the controller 120 may restrict the operation described with reference to FIG. 7 to a workload that pertains to writing the current write data with the same size, thereby allowing the operation to be performed in such a restricted manner. That is, in order to prevent a reverse effect due to frequent addition of the dummy data, the controller 120 restricts the operation described with reference to FIG. 7 to a workload that pertains to writing a small number of the current write data and maximizing an increase in read performance, thereby allowing the operation to be performed in such a restricted manner.

In addition, according to an embodiment of the present disclosure, the controller 210 may add the dummy data in such a manner as to be in proportion with the number of host write data. For example, the dummy data may be set to be added once for every 100 MB for writing for the host.

FIG. 12 is a table showing results of comparing read performance that results when employing the method of controlling a memory controller according to the embodiments of the present disclosure and read performance that results when employing a method of controlling a memory controller in the related art.

In FIG. 12, values under the field "before" in the table are obtained by a method of programming write data using a technique in the related art, and values under the field "after" are obtained by a method of programming write data according to an embodiment of the present disclosure. Accordingly, from FIG. 12, it can be seen that, in a case where write data are not aligned with each other in a die, the read performance is greatly decreased.

As described above, in the storage device with improved performance and the method of operating the storage device, which is a method of ensuring a minimum number of dies in the write data that is to be programmed, it is possible with addition of a dummy data piece to the data accumulated so far in the FTL write queue that successively subsequent write data are aligned in a die in an ensured manner.

According to an embodiment of the present disclosure, in a case where data written in a memory is read, the number of dies to which a request is made to read the data may be minimized in an ensured manner, and thus the read performance can be maximized.

The storage device according to an embodiment of the present disclosure operates regardless of the stripe size. The storage device and the method of operating the storage device are not limited only to a workload that pertains to reading and writing data with the same size.

According to an embodiment of the present disclosure, an operation of adding a dummy data may be performed according to various write data (of which the number is an integer multiple of the size of the wordline or an aliquot into which the size of the wordline is divided).

In the storage device and the method of controlling the memory controller according to embodiments of the present disclosure, the write data is programmable more efficiently, thereby improving read performance of the storage device.

However, the technical idea of the present disclosure is described above in various embodiments. It will be apparent to a person of ordinary skill in the art to which the present disclosure pertains that various alterations and modifications are possible to make to the embodiments of the present disclosure without departing from the nature and gist of the present disclosure. In addition, the embodiments disclosed in the present specification are for describing the technical idea of the present disclosure, rather than limiting it, and do not impose any limitation on the scope of the technical idea of the present disclosure. Accordingly, the scope of protection of the present disclosure should be defined by the following claims. All technical ideas that fall within the scope equivalent thereto should be interpreted to be included within the scope of the claims of the present disclosure. Furthermore, the embodiments may be combined to form additional embodiments.

What is claimed is:

1. A method of operating a memory controller, the method comprising:
   receiving, from a host, a program command comprising a write data to be written to a memory;
   computing a minimum number of dies in which the write data is programmable;
   determining, based on a size of data stored in a flash translation layer (FTL) write queue, whether the write data is programmable in the minimum number of dies;
   determining, based on whether the write data is programmable in the minimum number of dies, whether dummy data is necessary; and
   adding the dummy data to the FTL write queue when the dummy data is determined as necessary,
   wherein, if the data previously stored in the FTL write queue and the write data to be subsequently stored in the FTL write queue are not contained within the same die, the dummy data is added after the data previously stored in the FTL write queue and before the write data to be subsequently stored in the FTL write queue.

2. The method of claim 1,
   wherein the computing comprises determining, as the minimum number, a least integer equal to or greater than a value obtained by dividing a size of the write data by a reference size,
   wherein the reference size is a maximum size of data that can be programmed into or read from memory cells coupled to one wordline in one die.

3. The method of claim 2, wherein the determining whether the write data is programmable in the minimum number of dies comprises:
   determining whether an offset A is present, the offset A being a remainder that results from dividing the size of the data stored in the FTL write queue by the reference size;
   computing a size B by subtracting the offset A from the reference size; and
   comparing the size of the write data and the size B with each other.

4. The method of claim 3, wherein the determining whether the write data is programmable in the minimum number of dies further comprises:
   computing a size C representing a remaining size of the write data other than the size B;
   determining a number D by adding 1 to a least integer equal to or greater than a value obtained by dividing the size C by the reference size; and
   comparing the number D and the minimum number with each other.

5. The method of claim 3, wherein the determining whether the dummy data is necessary comprises:
   determining of whether a size of the write data is equal to or greater than the reference size;
   determining whether the size of the write data is an aliquot of the reference size; and
   determining whether the size of the write data is a multiple of the reference size.

6. The method of claim 1, wherein the adding of the dummy data comprising determining a size of the dummy data such that sum of the size of the data previously stored in the FTL write queue and the size of the dummy data becomes the reference size.

7. The method of claim 5, wherein the adding of the dummy data is performed based on a size of the write data.

8. The method of claim 5, wherein the adding of the dummy data is performed only in a case where a ratio of write data pieces having the same size to all pieces of the write data is equal to or higher than a predetermined value.

9. A storage device comprising:
   a memory including a plurality of dies; and
   a memory controller configured to:
   receive, from a host, a program command comprising a write data to be written to the memory;
   compute a minimum number of dies in which the write data is programmable;
   determine, based on a size of data stored in a flash translation layer (FTL) write queue, whether the write data is programmable in the minimum number of dies;
   determine, based on whether the write data is programmable in the minimum number of dies, whether dummy data is necessary; and
   add the dummy data in the FTL write queue when the dummy data is determined as necessary,
   wherein, if the data previously stored in the FTL write queue and the write data to be subsequently stored in the FTL write queue are not contained within the same die, the memory controller is configured to add the dummy data after the data previously stored in the FTL write queue and before the write data to be subsequently stored in the FTL write queue.

10. The storage device of claim 9,
wherein the memory controller computes the minimum number by determining, as the minimum number, a least integer equal to or greater than a value obtained by dividing a size of the write data by a reference size, and
wherein the reference size is a maximum size of data that can be programmed into or read from memory cells coupled to one wordline in one die.

11. The storage device of claim 10, wherein the memory controller determines whether the write data is programmable in the minimum number of dies by:
   determining whether an offset A is present, the offset A being a remainder that results from dividing the size of the data stored in the FTL write queue by the reference size,
   computing a size B by subtracting the offset A from the reference size, and
   comparing the size of the write data and the size B with each other.

12. The storage device of claim 11, wherein the memory controller determines whether the write data is programmable in the minimum number of dies further by:
   computing a size C representing a remaining size of the write data other than the size B;
   determining a number D by adding 1 to a least integer equal to or greater than a value obtained by dividing the size C by the reference size; and
   comparing the number D and the minimum number with each other.

13. The storage device of claim 11, wherein the memory controller determines whether the dummy data is necessary by:
   determining whether a size of the write data is equal to or greater than the reference size,
   determining whether the size of the write data is an aliquot of the reference size, and
   determining whether the size of the current write data is a multiple of the reference size.

14. The storage device of claim 9, wherein the memory controller is configured to determine a size of the dummy data such that sum of the size of the data previously stored in the FTL write queue and the size of the dummy data becomes the reference size.

15. The storage device of claim 13, wherein the memory controller adds the dummy data based on a number of pieces of the write data.

16. The storage device of claim 13, wherein the memory controller adds the dummy data only in a case where a ratio of write data pieces having the same size to all pieces of the write data is equal to or higher than a predetermined value.

* * * * *